United States Patent
Miao et al.

(10) Patent No.: US 7,917,526 B2
(45) Date of Patent: *Mar. 29, 2011

(54) GROUP-BY RESULT SIZE ESTIMATION

(75) Inventors: Bingjie Miao, Tigard, OR (US);
Srinivasan R. Mottupalli, Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 490 days.

This patent is subject to a terminal disclaimer.

(21) Appl. No.: 11/956,855

(22) Filed: Dec. 14, 2007

(65) Prior Publication Data

US 2008/0098053 A1    Apr. 24, 2008

Related U.S. Application Data

(63) Continuation of application No. 10/811,988, filed on Mar. 30, 2004, now Pat. No. 7,343,366.

(51) Int. Cl.
*G06F 7/00* (2006.01)
*G06F 17/30* (2006.01)

(52) U.S. Cl. ......................... 707/765; 707/802

(58) Field of Classification Search ............... None
See application file for complete search history.

(56) References Cited

U.S. PATENT DOCUMENTS

| | | | |
|---|---|---|---|
| 5,598,559 A | 1/1997 | Chaudhuri | |
| 5,761,653 A | 6/1998 | Schiefer et al. | |
| 5,832,475 A * | 11/1998 | Agrawal et al. | 707/999.002 |
| 6,456,999 B1 | 9/2002 | Netz | |
| 6,519,604 B1 | 2/2003 | Acharya et al. | |
| 6,741,982 B2 * | 5/2004 | Soderstrom et al. | 707/999.003 |
| 6,842,753 B2 * | 1/2005 | Chaudhuri et al. | 707/999.001 |
| 7,343,855 B2 * | 3/2008 | Schneider et al. | 707/999.002 |
| 2001/0037327 A1 | 11/2001 | Haas et al. | |
| 2003/0065688 A1 | 4/2003 | Dageville et al. | |
| 2003/0135485 A1 | 7/2003 | Leslie | |
| 2006/0053103 A1 | 3/2006 | Chaudhuri et al. | |

* cited by examiner

*Primary Examiner* — Sathyanarayan Pannala
(74) *Attorney, Agent, or Firm* — Lieberman & Brandsdorfer, LLC

(57) ABSTRACT

A method and system for accurately estimating a result size of a Group-By operation in a relational database. The estimate utilizes the probability of union of the columns involved in the operation, as well as the relative cardinality of each column with respect to the other columns in the operation. In addition, the estimate incorporates the use of table filters when indicated such that table filters are applied prior to determining the size of the tables in the operation, as well as including equivalent columns into the list of columns that are a part of the Group-By operation. Accordingly, the estimate of the result size of the operation includes influencing factors that provide an accurate estimation of system memory requirements.

10 Claims, 4 Drawing Sheets

GROUP-BY RESULT SIZE ESTIMATION

CROSS REFERENCE TO RELATED APPLICATION(S)

This application is a continuation of application Ser. No. 10/811,988, filed on Mar. 3, 2004, now pending, which is hereby incorporated herein by reference.

BACKGROUND OF THE INVENTION

1. Technical Field

This invention relates to relational database systems. More specifically, the invention relates to estimating the size of a Group-By operation in a relational database.

2. Description Of The Prior Art

Relational database systems store large amounts of data, including business data that can be analyzed to support business decisions. Typically, data records in a relational database management system in a computing system are maintained in tables, which are a collection of rows all having the same columns. Each column maintains information on a particular type of data for the data records which comprise the rows. Tables that are accessible to the operator are known as base tables, and tables that store data that describe base tables are known as catalog tables. The data stored in the catalog table is not readily visible to an operator of the database. Rather the data stored in the catalog table pertains to meta-data. In the case of a database, the meta-data stored in the catalog table describes operator visible attributes of the base table, such as the names and types of columns, as well as statistical distribution of column values. Typically, a database includes catalog tables and base tables. The catalog tables and base tables function in a relational format to enable efficient use of data stored in the database.

A relational database management system uses relational techniques for storing, manipulating, and retrieving information, and is further designed to accept commands to store, retrieve, and remove data. Structured Query Language (SQL) is a commonly used and well known example of a command set utilized in relational database management systems, and shall serve to illustrate a relational database management system. An SQL query often includes predicates, also known as user specified conditions. The predicate are used to limit query results. One common operation in an SQL query is a Group-By operation where data is segmented into groups and aggregate information is derived for these groups. The Group-By operation partitions a relation into non-overlapping sets of rows from one or more tables, and then mathematically manipulates separately over each set. The number of results produced by a Group-By operation depends on the number of non-overlapping sets of rows, which in turn depends on the number of columns of the Group-By operation.

In most database systems, a cost-based query optimizer uses query predicates to estimate resource consumption and memory requirements in determining the most efficient query execution plan. Because resource consumption and memory requirements depend on the number of rows that need to be processed, knowledge of the number of rows resulting from each sequence of operators in a query plan is important. Such operators may include: scan, which looks at one table and provides a stream of rows from the table; join, which combines two streams of rows that have been scanned into one stream; equal join, which only joins rows together that satisfy an equality condition; group, which segments rows from an input stream and puts aggregated rows into an output stream; and sort, which sorts an input stream according to user specification to produce an output stream in order. A grouping operation gathers together rows having the same value on specified columns to produce a single row. Accordingly, a Group-By operation needs to look at all input rows before producing a result.

Immediate Group-by results are stored in memory. Memory requirements for a Group-By operation are determined by an estimate of the result size of the Group-By operation. Accurate estimation of a result size from a Group-By operation is important in estimating the memory requirement of the operation. Failure to allocate sufficient memory for the Group-By operation will require an overflow of the memory to disk, which will reduce the efficiency of a query execution. However, if more than a necessary amount of memory is allocated to the Group-By operation, the amount of memory available for other concurrent operations will be reduced, and thereby reduce the efficiency of the entire system. Accordingly, an increased accuracy in estimation of the result size of a Group-By operation will improve the usage of available memory and thereby increase the overall efficiency of the system.

There is therefore a need for an efficient and accurate method of estimating a result size of a Group-By operation in order to more accurately predict system memory requirements.

SUMMARY OF THE INVENTION

This invention comprises a method and system for accurately estimating Group-By selectivity associated with a Group-By operation.

In one aspect of the invention, a computer system is provided with a processor in communication with storage media, with the storage media having a database with data records maintained in tables. A selectivity manager is provided in the system in communication with the database. The selectivity manager calculates a cumulative selectivity based upon an aggregation of individual selectivity of each column in a group of tables in a Group-By operation, including a determination of a table in the group with a largest quantity of rows, addition of equivalent columns to a Group-By list, and for each column in the list to obtain a Group-By selectivity from an associated catalog table. A result size manager is provided in communication with the selectivity manager and the database to compute a memory requirement for the Group-By operation based on the calculated cumulative selectivity. The result size manager allocates memory for the operation based upon the memory requirement.

In another aspect of the invention, an article is provided with a computer-readable data storage medium including computer program instructions configured to estimate a result size of a Group-By operation in a database. Instructions are provided to organize a database stored on a computer readable medium with data records maintained in multiple tables. In addition, instructions are provided to calculate a cumulative selectivity based upon aggregation of individual selectivity of each column in a group of tables in a Group-By operation, including determining a table in the group with a largest quantity of rows, adding equivalent columns to a Group-By list, and for each column in the list obtaining a Group-By selectivity from an associated catalog table. Instructions are also provided to compute a memory requirement for the Group-By operation based on the calculated cumulative selectivity, and to allocate memory for the operation based upon the memory requirement.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a relational database environment, the Group-By operation enables an operator to aggregate input rows of the database that involves columns from one or more tables. A Group-By operation can result from explicit or implicit aggregation in an SQL query, such as a Group-By clause, a distinct clause, or a union that requires elimination of duplicate rows. An estimate of the result size of the Group-By operation is used to compute memory requirements. There are two factors that are used to estimate a result size of a Group-By operation, the Group-By selectivity, and the size of the input to the Group-By operation. The input size is known. The Group-By selectivity is calculated from the degree of uniqueness of each column in the Group-By operation. The degree of uniqueness, referred to hereafter as selectivity, is a statistical value associated with each column, and in general is representative of the ratio of the number of distinct values and the total number of rows in a table. Note, the selectivity as defined herein represents Group-By selectivity and should not be confused with the filtering effect of operators. In the prior art, when the Group-By operation involves multiple columns from a single table or columns from different tables, the accuracy of the estimation of the Group-By selectivity associated with the operation decreases. In accordance with the present invention, by utilizing a mathematical theory of probability of union and normalizing the Group-By selectivity associated with each column in the operation, a realistic estimate for the result size of the operation can be achieved. Accordingly, an improved calculation of the Group-By selectivity using the probability of union theory enables efficient use of system memory.

Technical Details

Figure 1:
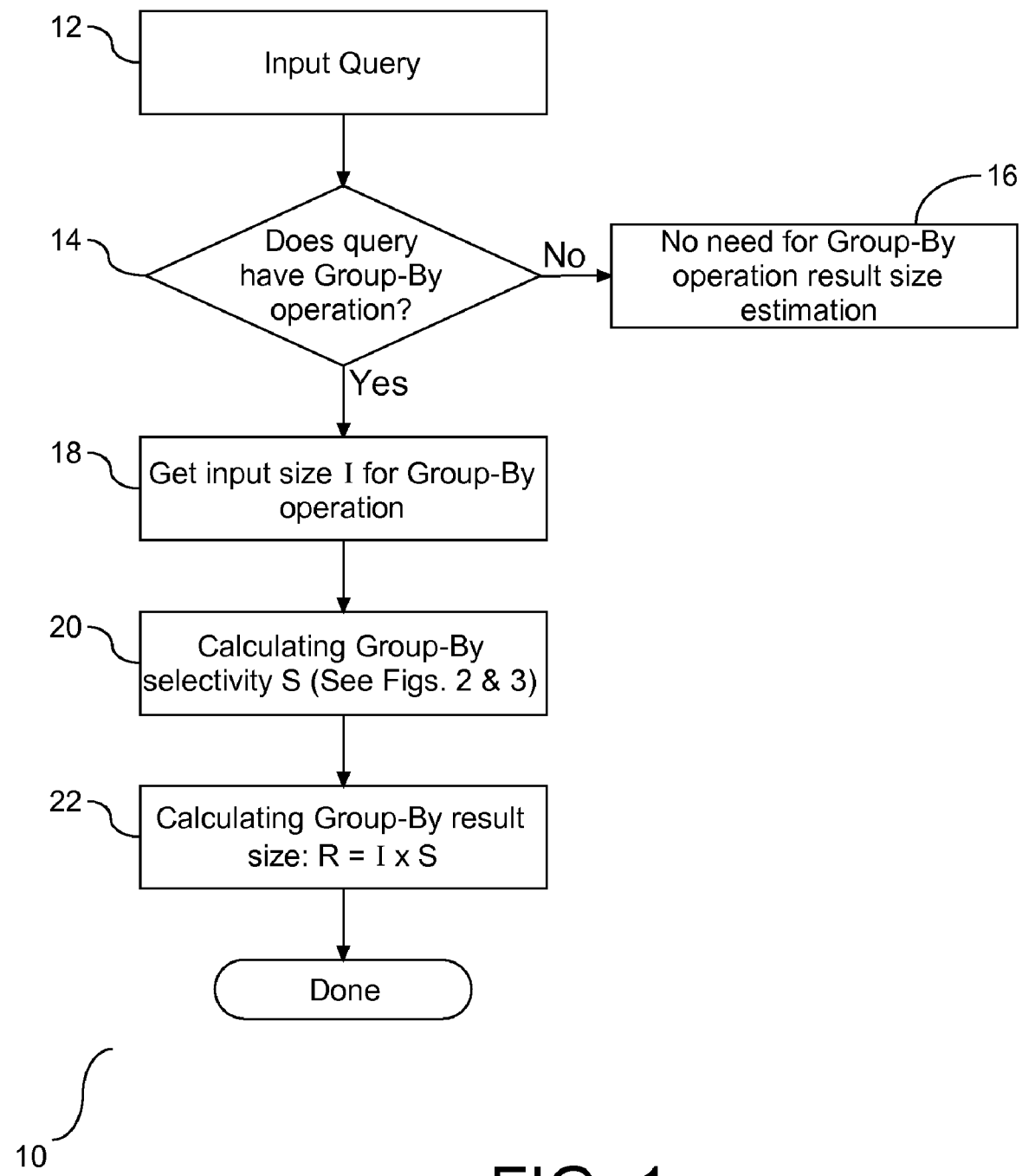
FIG. 1 is a flow chart illustrating a prior art method of calculating a Group-By operation result size based on calculated Group-By selectivity and input size.
Figure 2:
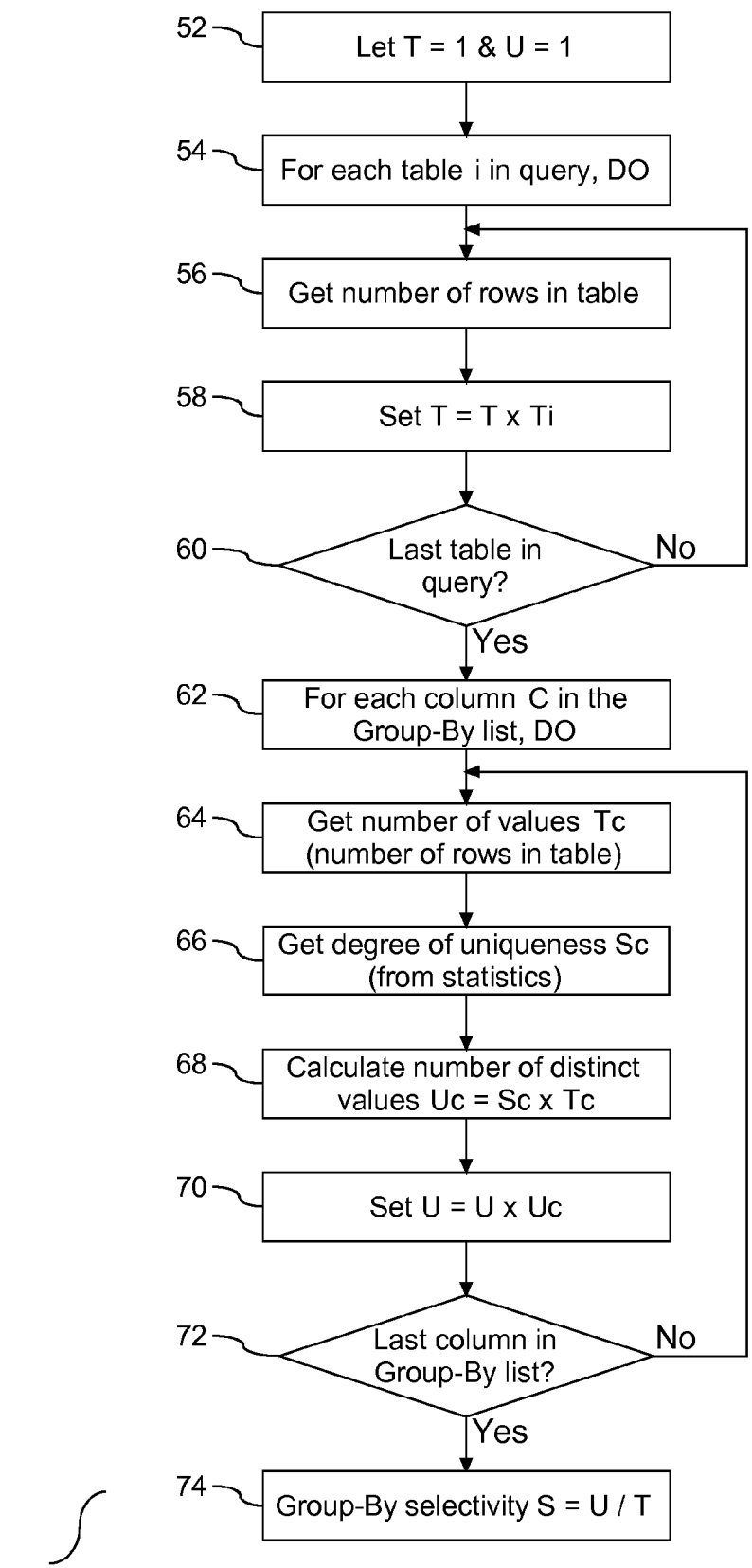
FIG. 2 is a flow chart illustrating a prior art method of calculating a selectivity factor in a Group-By operation.
Figure 3A:
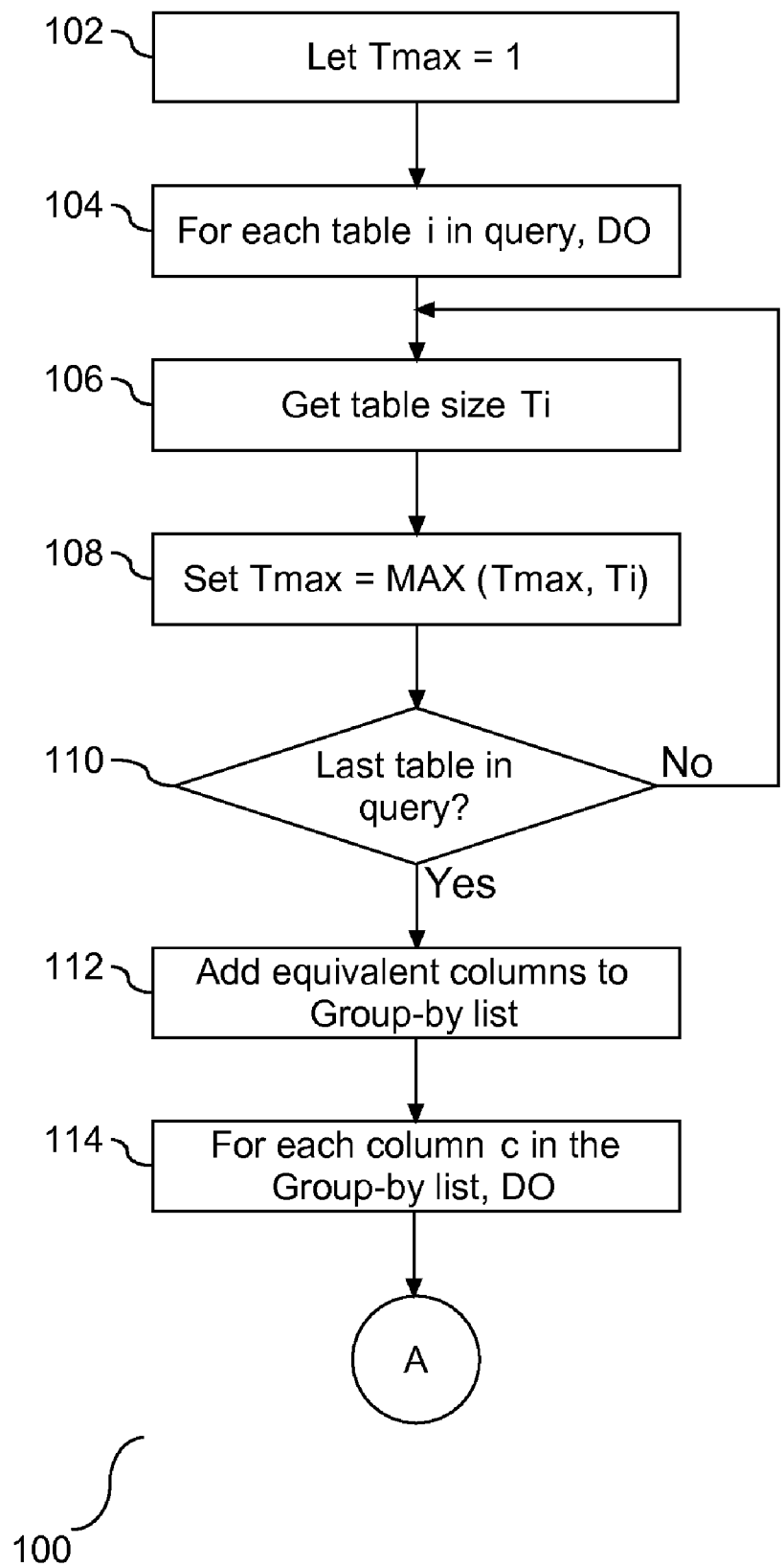
FIGS. 3A and 3B are flow charts illustrating a method of calculating a selectivity factor according to the preferred embodiment of this invention, and is suggested for printing on the first page of the issued patent.
Figure 3B:
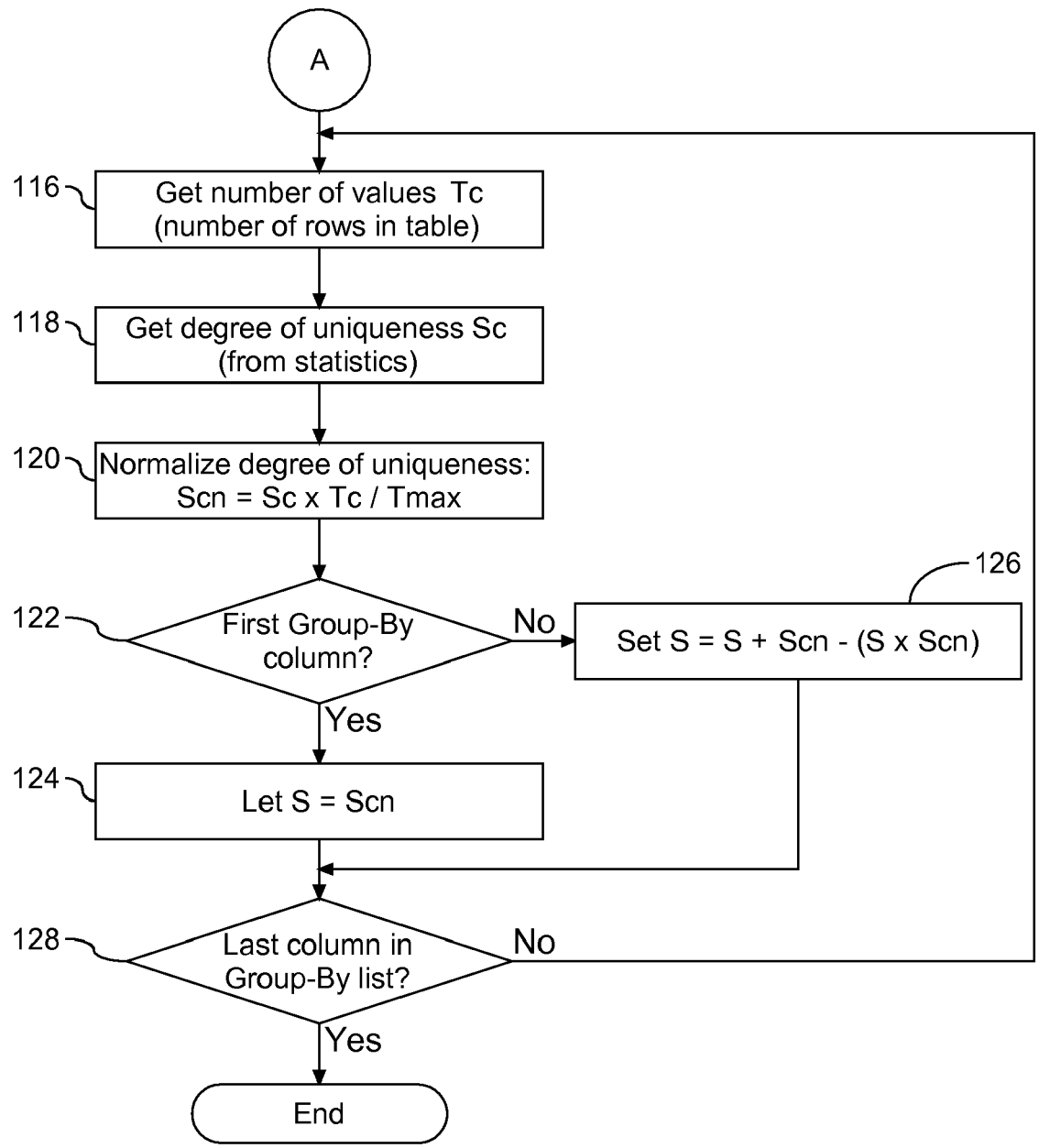

FIG. 1 is a flow chart (10) illustrating the process of calculating the result size of a Group-By operation. As shown within the flow chart, there are two primary factors for calculating the result size of such an operation, a) the size of input to the operation, and b) the selectivity. The first step is the placement of an input query by the operator (12). A database query that has a Group-By operation will include an explicit or implicit aggregation of rows from one or more tables. Once the input query is received, a test is conducted to determine if the query has a Group-By operation (14). If there is no Group-By operation present, there is no need to calculate a result size estimation for a Group-By operation (16). However, if there is a Group-By operation present, the input size for the Group-By operation is obtained from the size of the input stream associated with the input query (18). In a typical Group-By operation, the input size of the operation is a known quantity, which may be produced by the optimizer prior to entering the Group-By operation. Following the process of obtaining the input size of the query, the selectivity of the Group-By operation is calculated (20). Selectivity is calculated based upon multiple factors. As such, a manipulation or change of any of the selectivity factors will affect the calculation of the result size of the operation. A prior art method for calculating selectivity is shown in FIG. 2, and a method of calculating selectivity according to an embodiment of this invention is shown in FIGS. 3A and 3B. Once the selectivity has been calculated, the result size of the Group-By operation is calculated by multiplying the selectivity by the input size of the operation (22). Accordingly, since the input size of the operation is a known quantity, any changes to the selectivity component of the operation can vary the result size of the Group-By operation.

FIG. 2 is a flow chart (50) illustrating one example of a prior art method for calculating selectivity associated with a Group-By operation. In this illustration, T represents all possible combinations of rows from all tables involved in the query or input stream, and U represents all unique combinations of columns involved in the Group-By operation. Initially, T and U are set at a constant of one (52). There are two subroutines in this process. A first subroutine pertains to a calculation associated with the rows of the tables in the query, and the second subroutine pertains to a calculation associated with the columns in the operation. Following step (52), the first subroutine (54) is entered to calculate the product of all rows for each table in the query. The first step of the subroutine is to obtain the quantity of rows from the table, $T_i$ (56). Thereafter, the product of rows from all tables is calculated (58). The first time the subroutine is entered, the product is the quantity of rows in the first table. However, the second time the subroutine is entered, the product is the quantity of rows in the first table multiplied by the quantity of rows in the second table. Following step (58), a test is conducted to determine if the product of rows has been calculated for the last table in the query (60). A negative response to the test will result in an increment of "I" and continuation of the subroutine, and a positive response will result in termination of the subroutine. Accordingly, the first part of calculating selectivity includes a subroutine for determining the product of all table sizes in the query, wherein the table sizes are based upon the quantity of rows in the tables of the operation.

Once the first subroutine is complete for calculating the product of all table sizes, a second subroutine is entered for each column in the Group-By operation (62). First, the number of rows $T_c$ in the table is obtained for the specified column "c" (64). Thereafter, the selectivity $S_c$, is obtained for the specified column (66). This selectivity is a statistical value stored in the system catalog tables. The number of distinct values in the specified column $U_c$ is then calculated as follows:

$$U_c = S_c \times T_c \qquad \text{Equation 1}$$

(68), where $T_c$ is the number of rows in the table obtained at step (64), and $S_c$ is the selectivity obtained at step (66). Thereafter, a calculation of the quantity of unique combinations of columns in the operation is obtained (70) by multiplying the number of distinct column values obtained in Equation 1 for each column in the operation. For multiple columns in the operation, the value obtained at step (70) is the total number of unique combinations for all of the columns in consideration. Steps (64), (66), (68), and (70) are repeated for each column in the Group-By operation. Following step (70), a test (72) is conducted to determine if the last column in the Group-By list has been reached. A negative response to the test at step (72) will result in an increment of "c" and then a continuation of the subroutine at step (64). However, a positive response to the test at step (72) will enable calculation of selectivity (74) based upon the calculation of table sizes, T, from step (58), and the calculation of the number of unique column values, U, from step (70). Selectivity for the Group-By operation is calculated as follows:

$$S = U/T \qquad \text{Equation 2}$$

Accordingly, the prior art method for calculating selectivity is based upon factors associated with a product of all table sizes and a product of the number of unique values for all of the columns.

However, there are limitations associated with the illustrated prior art method of calculating selectivity. For example, the prior art does not take advantage of the relationship of columns in the same table. Nor does the prior art consider equivalent columns that are not explicitly specified in the Group-By operation. The presence of these limitations produces an inaccurate estimation of selectivity as it is not a true reflection of the relationship of the columns in the operation. FIGS. 3A and 3B together encompass a flow chart (100) illustrating a novel method of calculating selectivity according to the present invention which is used to calculate a more accurate estimate of the result size of the Group-By operation in situations where there are multiple Group-By columns, and more so when the operation involves multiple columns from two or more tables. A Group-By operation often involves the use of multiple tables, wherein different tables are different sizes, i.e. different numbers of rows. To compensate for the inclusion of multiple tables in the operation, a factor is applied to each selectivity for each column. The first subroutine in the process of calculating selectivity is to find the table in the operation with the largest quantity of rows, $T_{max}$, i.e. the largest size table. Initially $T_{max}$ is set at a value of one (102). Thereafter, for each table "I" in the operation (104), the table size based upon the number of rows, $T_i$, for that table is obtained (106). The table size $T_i$ is compared to the $T_{max}$ value, and the larger table size value between the two values is set as $T_{max}$ (108). Thereafter, a test is conducted to determine if the table considered at step (108) is the last table in the operation (110). If the response to the test at step (110) is negative, "I" is incremented and the subroutine returns to step (106) to obtain the table size for the next table in the operation. However, if the response to the test at step (110) is positive, the subroutine is complete and the final $T_{max}$ value is the size of the largest table in the operation based upon the criteria of the number of rows in the tables.

The next part of the selectivity calculation concerns the columns of the tables in the operation. All columns that contribute to the Group-By operation, referred to as the Group-By list, must be taken into consideration in order to obtain an accurate estimate for the Group-By selectivity. For example, if two columns from two separate tables are considered equivalent based upon an equal join predicate, and one of the columns in a first table is part of the Group-By list, then the corresponding join column in a second table is also part of the Group-By operation regardless of whether this column is specified in the Group-By list. Following the determination of $T_{max}$ in the first subroutine, equivalent columns are added to the Group-By list (112). Thereafter, a second subroutine is entered to calculate selectivity. For each column "c" in the Group-By list (114), the number of rows in the associated table, $T_c$, is obtained from the associated catalog table (116). Thereafter, selectivity, $S_c$, is obtained from the associated catalog table for the column in consideration (118). The selectivity for the column is then normalized according to the following:

$$S_{cn} = S_c \times (T_c/T_{max}) \qquad \text{Equation 3}$$

(120), where $S_c$ is obtained at step (118), $T_c$ is obtained at step (116), $T_{max}$ is obtained at step (108), and $S_{cn}$ represents normalized selectivity for column "c". The normalization of the selectivity for each column is conducted to equalize the contribution of each column in the operation. Following the normalization process, a test is then conducted to determine if the column in this second subroutine is the first column for which the normalized selectivity was calculated for this Group-By operation (122). A positive response to the test at step (122) will result in the Group-By selectivity, S, being set to the normalized selectivity (124) calculated at step (120). However, a negative response to the test at step (122) will result in the Group-By selectivity, S, being calculated as follows:

$$S = S + S_{cn} - (S \times S_{cn}) \qquad \text{Equation 4}$$

(126). This formula for calculating Group-By selectivity includes the relationship of the grouping of columns in the operation. A verbal translation of Equation 4 is as follows: the probability of two rows, with each row having two columns, being different is the probability of first column being different plus the probability of the first column being the same but the second column being different. If there are multiple columns, a cumulative Group-By selectivity is calculated based upon the same factors by returning to step (116) of the second subroutine. Following either step (124) or (126), a final test in the method of calculating the Group-By selectivity is conducted to determine if the column in consideration in the prior iteration of the second subroutine was the last column in the Group-By list of columns (128). A negative response to the test at step (128) will cause an increment of "c" followed by a return to step (116), and a positive response will result in completion of the calculation.

The process shown herein for calculating the selectivity for the Group-By operation takes into consideration a plurality of factors that are not present in the prior art, wherein these factors provide an accurate estimation of the Group-By selectivity. Once the calculation of the Group-By selectivity has been completed, i.e. a positive response to the test at step (128), the product of the Group-By selectivity and the input size of the operation, as shown at step 22 of FIG. 1, will result in an accurate estimate of the result size of the Group-By operation. Accordingly, the process outlined in FIGS. 3A and 3B demonstrate an improved method of calculating the selectivity in a Group-By operation that takes into consideration the maximum size of the tables in the operation, the relative uniqueness of a column based upon the size of the table in which the column resides, the equivalency of columns based on equal join predicates, and the probability of union of two or more columns from two or more tables.

The invention as shown in FIGS. 1, 3A, and 3B is illustrated as a method. However, it may also be a module associated with a database or an article of manufacture embodied within the instructions of a computer implemented system. For example, the module may be a Group-By result size estimator used in a database system, or it may be embedded within the database system.

Advantages Over the Prior Art

Memory requirements for a Group-By operation are determined by the estimate of the result size. The method of estimating a result size of a Group-By operation that produces a realistic estimate will enable efficient use of memory associated with the operation. An accurate estimate minimizes inefficient memory utilization such as overflow of memory to disk or unavailability of memory for other operations of the database. Accordingly, an accurate estimate of the result size of the operation enables effective and efficient usage of memory for both the operation in consideration, as well as other operations associated with the database and the system.

Alternative Embodiments

It will be appreciated that, although specific embodiments of the invention have been described herein for purposes of illustration, various modifications may be made without departing from the spirit and scope of the invention. In particular, table filters may be applied to the tables in the query. A table filter is a predicate that limits the result size of the operation. If there are table filters in the query, the table filters are applied to the tables that are a part of the query prior to entering the first subroutine of the preferred embodiment. Accordingly, the scope of protection of this invention is limited only by the following claims and their equivalents.

We claim:

1. A computer system having a Group-By operation size estimator comprising:
   a processor in communication with storage media;
   said storage media having a database with data records maintained in tables;
   a selectivity manager in communication with said database, said selectivity manager adapted to calculate a cumulative selectivity based upon an aggregation of selectivity of an individual column in a group of tables in a Group-By operation, wherein the step of calculating a cumulative selectivity is based upon the following mathematical relationship: $S_{ab}=S_a+S_b-(S_a \times S_b)$, wherein $S_a$ is a selectivity of column "a", $S_b$ is the selectivity of column "b", and $S_{ab}$ is a cumulative selectivity of columns "a" and column "b"; and
   a result size manager in communication with said database adapted to receive said calculated cumulative selectivity from said selectivity manager, to estimate a size of said Group-By operation as a product of said calculated cumulative selectivity and an input size of said Group-By operation, to compute a memory requirement for said Group-By operation based on said estimated size of said Group-By operation, and to allocate memory for said operation based upon said memory requirement.

2. The estimator of claim 1, wherein said selectivity manager is adapted to normalize a selectivity for each column in said group.

3. The estimator of claim 2, wherein normalization of said selectivity includes a weight factor adapted to be applied to said cumulative selectivity calculation.

4. The estimator of claim 3, wherein said weight factor includes a relative size of a table in which said column resides.

5. The estimator of claim 1, wherein said selectivity manager is adapted to iteratively apply said mathematical relationship for each additional column in said group.

6. The estimator of claim 1, wherein said selectivity manager is adapted to include equivalent columns of said group based upon query predicates.

7. An article comprising:
   a database stored on a computer-readable data storage medium with data records maintained in multiple tables;
   means in the medium for calculating a cumulative selectivity of each column in a group of tables in a Group-By operation, wherein the step of calculating a cumulative selectivity is based upon the following mathematical relationship: $S_{ab}=S_a+S_b-(S_a \times S_b)$, wherein $S_a$ is a selectivity of column "a", $S_b$ is the selectivity of column "b", and $S_{ab}$ is a cumulative selectivity of columns "a" and column "b";
   means in the medium for estimating a result size of said operation based upon said cumulative selectivity;
   means in the medium for computing a memory requirement for said Group-By operation based on said estimated result size; and
   means in the medium for allocating memory for said operation based upon said memory requirement.

8. The article of claim 7, wherein said means for calculating said cumulative selectivity includes means for normalizing a selectivity for each column in said group.

9. The article of claim 8, wherein said means for normalizing said selectivity includes a weight factor based upon of a relative size of a table of said column.

10. The article of claim 7, wherein said means for calculating said cumulative selectivity is inclusive of equivalent columns.

* * * * *